2,980,666
AZO DYESTUFFS OF LOW SOLUBILITY IN WATER

Ernest Merian, Bottmingen, and Bruno J. R. Nicolaus, Basel, Switzerland, assignors to Sandoz Ltd., Basel, Switzerland No Drawing. Filed June 9, 1958, Ser. No. 740,603
Claims priority, application Switzerland June 13, 1957
6 Claims. (Cl. 260—158)

The present invention relates to a process for the production of new azo dyestuffs which have low solubility in water and correspond to the general formula:

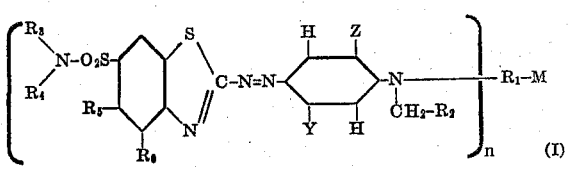

wherein $R_3$ stands for hydrogen, low molecular alkyl, low molecular hydroxyalkyl or low molecular alkoxyalkyl, $R_4$ for hydrogen, low molecular alkyl, low molecular hydroxyalkyl, low molecular alkoxyalkyl, aryl, cycloalkyl, or aralkyl, $R_5$ for hydrogen, low molecular alkyl or, together with $R_6$, —CH=CH—CH=CH—, $R_6$ for hydrogen, low molecular alkyl or, together with $R_5$, —CH=CH—CH=CH—, Y for hydrogen, halogen, a low molecular alkyl or alkoxy radical, the trifluoromethyl or trifluoroacetyl radical or an alkanoylamino radical with at most 18 carbon atoms, $R_1$ for a divalent aliphatic radical with 1 to 4 carbon atoms, $R_2$ for a hydroxyalkyl, dihydroxyalkyl, alkoxyalkyl, cyanoalkyl or acetoxyalkyl radical, the latter of which may be further substituted, or the difluoromethyl or trifluoromethyl radical, or the radical of a fluorinated cyanoalkyl, a carbalkoxyalkyl or a carbamic acid alkyl ester, M for hydrogen, hydroxyl, an alkoxy radical, an acetoxy radical which may be further substituted or a carbamic acid alkyl ester radical, when $n$ stands for the figure 1, or for a simple C–N linkage when $n$ stands for the figure 2, $n$ for the figure 1 or 2, and Z for hydrogen, methyl or methoxy or, together with —N—CH$_2$—R$_2$ and the adjacent benzene nucleus, a tetrahydroquinoline ring.

Especially valuable are the monoazo dyestuffs which correspond to the formula

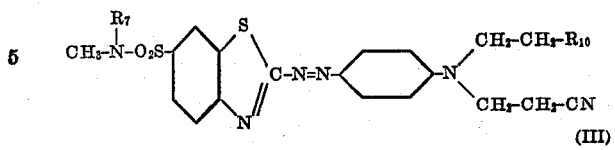

wherein $R_7$ stands for hydrogen, methyl or phenyl,
$R_8$ stands for methyl or phenylamino, and
$R_9$ stands for hydrogen, chlorine, methyl, acetylamino or propionylamino, and the monoazo dyestuffs which correspond to the formula

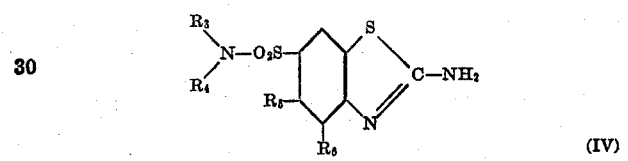

wherein $R_7$ stands for hydrogen, methyl or phenyl, and
$R_{10}$ stands for hydrogen, methyl, ethyl, hydroxy and acetoxy.

A number of the new, poorly water-soluble azo dyestuffs dye from aqueous dispersion polyamide fibers, e.g. nylon, "Perlon" (registered trademark), secondary cellulose acetate and cellulose triacetate fibers, polyvinyl fibers and terephthalic acid ester fibers, e.g. "Terylene," "Dacron" (registered trademarks) in brilliant red and violet shades. The fastness properties of the dyeings are excellent. Certain of the new dyestuffs are also suitable for coloring lacquer media, oils and synthetic resins, and for the mass pigmentation of manufactured fibers.

The process for the production of the poorly water-soluble azo dyestuffs consists in diazotizing $n$ mols of an amine of the formula

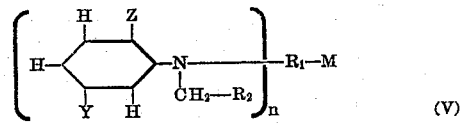

wherein $R_3$, $R_4$, $R_5$ and $R_6$ possess the meanings assigned to them above, and coupling with 1 mole of a coupling component of the formula

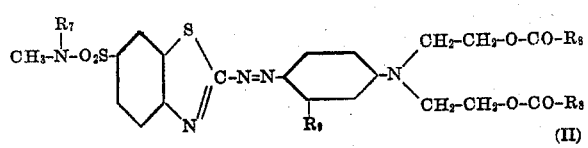

wherein $R_1$, $R_2$, M, X, Y and $n$ possess the above-stated meanings.

The diazo compounds are coupled with the coupling components in an acid medium, which may be buffered if desired.

The aminobenzothiazolesulfonic acid amides, which are employed in the form of their diazo compounds, are in part new. The process whereby they are obtained consists in reacting 1 mol of a compound of the formula

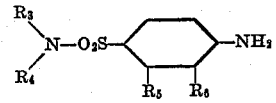

wherein $R_3$, $R_4$, $R_5$ and $R_6$ possess the aforenamed meanings, with thiocyanic acid and cyclizing the resultant orthoaminothiocyanate.

A further process consists in reacting 1 mol of a compound of the formula

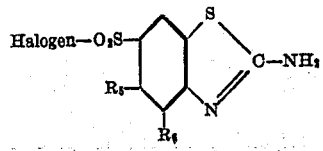

the free amino group of which may be protected by a readily splittable acyl radical, with an amine of the formula

followed where necessary by splitting off the acyl radical in the reaction product. Formation of this acid amide is effected preferably in presence of an acid-binding agent or with the aid of an excess of the amine

When the acyl radical is present it can be split off in the normal way by partial hydrolysis, higher temperatures being most effective.

In some instances special conditions are necessary for diazotizing the aminothiazole compounds. Some of them form very poorly soluble sulfates and therefore cannot be diazotized in concentrated sulfuric acid; where this is the case, diazotization can be carried out, for example, in phosphoric acid.

The azo dyestuffs of this invention which are employed as disperse dyestuffs are especially notable for their high brilliancy and very good fastness to light, gas fumes, sublimation, pleating, washing, perspiration, water and sea water on secondary cellulose acetate, cellulose triacetate and polyester fibers. The dyeings are white dischargeable. The dyestuffs give a fairly good reserve of viscose, cotton and wool, especially when aftertreated with hydrosulfites.

Those azo dyestuffs which are suitable for the spin-dyeing of acetate possess high fastness to light, washing, cross-dyeing, alkaline bleaching, gas fumes, oxalic acid, dry cleaning and peroxide bleaching. They also show excellent fastness to sea water, perspiration, water, soap baths, rubbing, decatizing and pressing.

In the following examples all parts and percentages are by weight and the temperatures are in degrees centigrade. The melting points are uncorrected.

EXAMPLE 1

12.1 parts of 2-aminobenzothiazole-6-sulfonic acid-methylamide are dissolved in 50 parts of 85% phosphoric acid at 20°. After cooling to 5°, 3.8 parts of sodium nitrite are added in the course of the next hour. Diazotization takes place very rapidly with precipitation of the diazo compound in the form of fine needles. In spite of vigorous agitation the resultant mass is of very thick consistency and it is advisable to dilute it with 40 parts of glacial acetic acid. On completion of diazotization a solution of 10.5 parts of N-hydroxyethyl-N-cyanoethylaminobenzene in 20 parts of glacial acetic acid is added to the mass. Formation of the dyestuff follows in a short time and is accelerated by the addition of 50 parts of sodium acetate. After 30 minutes the mass is unloaded into 500 parts of water. The new dyestuff formed is filtered off, washed neutral with water and subsequently boiled in water to extract the small amount of unreacted starting product. Thus purified, the water-insoluble monoazo dyestuff dissolves in organic solvents to give brilliant red solutions. It corresponds to the formula

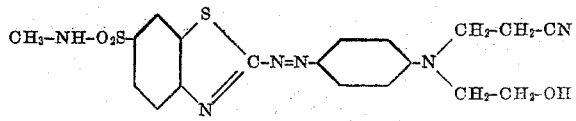

The melting point of the dyestuff is 156°. It is applied to cellulose acetate fibers at high temperatures from aqueous dispersion, preferably in presence of compounds with dispersing action, to give brilliant pink shades which show good fastness to light, gas fumes, sublimation and wet treatments. The dyeings are readily dischargeable.

When N-hydroxyethyl-N-cyanoethylaminobenzene is replaced by aliquot amounts of N-hydroxyethyl-N-difluoroethylaminobenzene or 1-(N-hydroxyethyl-N-cyanoethyl)-amino-3-methylbenzene, similar dyestuffs are obtained which show practically the same fastness to light.

Again, by employing as coupling components 1-N,N-dihydroxyethylamino-3-methylbenzene, 1-N,N-dihydroxyethylamino-3-acetylaminobenzene, 1-N,N-dihydroxyethylamino-3-acetylamino-6-methoxybenzene, 1-N,N-diacetoxyethylamino-3-propionylaminobenzene, dyestuffs of rather more bluish shade are obtained, some of which are faster to washing than those previously described.

The diazo component used here is new. One method of producing it is as follows. 186 parts of 1-aminobenzene-4-sulfonic acid-methylamide, melting point 111° (melting point of acetyl compound 181–182°), are dissolved in 1000 parts of 95% acetic acid, and 202 parts of 87.5% sodium thiocyanate added. To the clear solution at 7–10° a mixture of 200 parts of bromine and 300 parts of 95% acetic acid is added dropwise. After two hours' stirring the mixture is poured into 5 liters of water. The reaction mass is cooled and brought to pH 7.0 with caustic soda, after which it is stirred for 16 hours and then filtered. The filter residue is mixed with 1000 parts of 5% caustic soda and heated to 95°, upon which the 2-aminobenzothiazole-6-sulfonic acid-methylamide formed goes into solution. The insoluble impurities are filtered off and on cooling the filtrate is neutralized, upon which the new 2-aminobenzothiazole-6-sulfonic acid-methylamide is precipitated. It is isolated by filtration and drying, and crystallizes from glacial acetic acid as colorless cubes with a melting point of 225°. On analysis the following values are obtained:

|   | Actual, Percent | Calculated, Percent |
| --- | --- | --- |
| C | 39.91 | 39.42 |
| H | 3.78 | 3.84 |
| O | 13.43 | 13.17 |
| N | 16.63 | 17.26 |
| S | 26.06 | 26.30 |

EXAMPLE 2

When the 12.1 parts of 2-aminobenzothiazole-6-sulfonic acid-methylamide in Example 1 are replaced by 12.8 parts of 2-aminobenzothiazole-6-sulfonic acid-dimethylamide (melting point 230°), a dyestuff is formed having the formula:

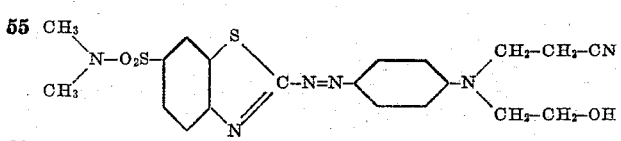

This dyestuff, which melts at 170°, dyes acetate, triacetate and polyester fibers from aqueous dispersion in brilliant red-pink shades which are outstandingly fast to light, gas fumes, sublimation and pleating. The dyeings are dischargeable and the reserve of cotton, viscose rayon and wool is very good. The dyestuff has somewhat poorer light fastness on polyamide fibers than on acetate.

A dyebath is prepared with 1 part of the above-described dyestuff dispersed with the aid of Turkey red oil, 6 parts of a sulfonated fatty alcohol and 3000 parts of water. 100 parts of secondary cellulose acetate fabric are introduced into the bath at room temperature; the temperature is raised to 80° in 1 hour and the bath maintained at this temperature for a further hour. After this time the dyeing process is completed and the material is removed, rinsed and dried.

To improve its dispersibility the dyestuff can be previously ground with suitable wetting, dispersing or emulsifying agents, preferably in presence of inorganic salts, for example Glauber's salt. Alternatively, it can be pasted with water, intimately mixed with a dispersing agent and then converted into a dyestuff powder by drying under suitable conditions.

Dyeing of rather more yellowish shade but of equally good fastness are obtained with the dyestuffs of the formulae:

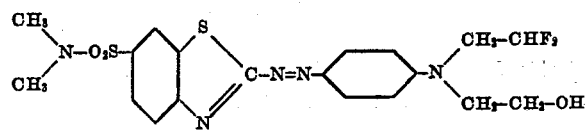

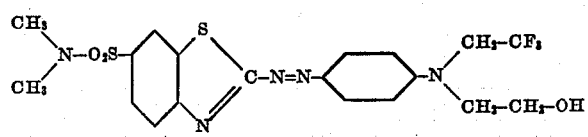

It is interesting to note that the dyestuffs of Examples 1 and 2 exhibit better building-up properties on cellulose triacetate and polyester fibers, e.g. "Dacron" (registered trademark), than the analogous dyestuffs produced from 2-amino-6-methylsulfonylbenzothiazole.

EXAMPLE 3

When the 12.1 parts of 2-aminobenzothiazole-6-sulfonic acid methylamide of Example 1 are replaced by 14.2 parts of 2-amino-benzothiazole-6-sulfonic acid-phenylamide (melting point 197°), the resultant dyestuff has the formula

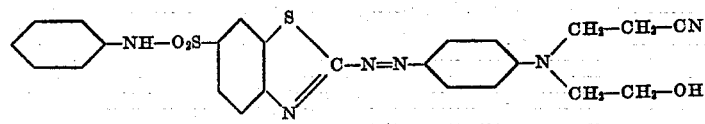

and a melting point at 140°. It dyes acetate and triacetate fibers from aqueous dispersion in brilliant pink-red shades of very good fastness. The acetone-solubility of the pure dyestuff is 40 grams per liter, a solubility which gives it good suitability for dyeing cellulose acetate in the spinning solution. A suitable spin-dyeing procedure is as follows.

100 parts of cellulose acetate are mixed for a short time with 300 parts of a mixture of solvents (93% acetone and 7% methanol) and left overnight to swell. Next day 1 part of the above dyestuff is dissolved in 60 parts of the same solvent mixture by simple shaking and the soluiton added to the main solution. The whole is stirred in an open mixing kettle until 60 parts of the solvent have evaporated. The dyed mass is pumped into the spinning pot in the usual way and spun. The formed filaments are of bright red shade and possess excellent fastness to light, washing, cross dyeing, alkaline chlorination, oxalic acid, peroxide, bleaching, gas fumes, dry cleaning, and hydrosulfite.

EXAMPLE 4

When the 12.1 parts of 2-aminobenzothiazole-6-sulfonic acid-methylamide of Example 1 are replaced by 15 parts of 2-aminobenzothiazole-6-sulfonic acid-3'-methoxypropylamide with melting point 126°, a dyestuff is obtained of formula

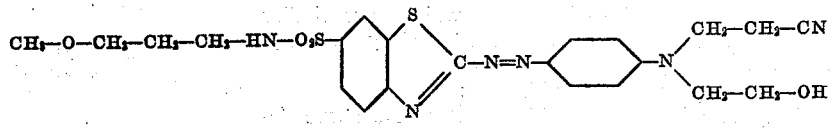

with a melting point at 103° and with similar dyeing properties.

EXAMPLE 5

When the 12.1 parts of 2-aminobenzothiazole-6-sulfonic acid-methylamide in Example 1 are replaced by 13.5 parts of 2-aminobenzothiazole-6-sulfonic acid-isopropylamide of melting point 212°, a dyestuff is obtained of formula

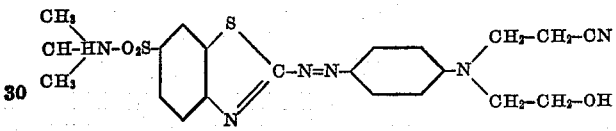

with similar dyeing properties and melting point 114°.

EXAMPLE 6

When the 10.5 parts of N-hydroxyethyl-N-cyanoethylaminobenzene of Example 1 are replaced by 9.2 parts of N-ethyl-N-cyanoethylaminobenzene, a dyestuff is obtained of formula

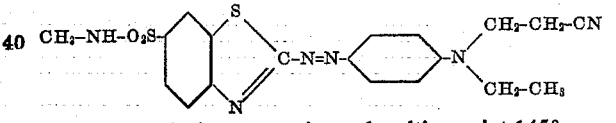

with similar dyeing properties and melting point 145°.

EXAMPLE 7

When the 10.5 parts of N-hydroxyethyl-N-cyanoethylaminobenzene in Example 1 are replaced by 11.5 parts of N-acetoxyethyl-N-cyanoethylaminobenzene, a dyestuff is obtained having the formula

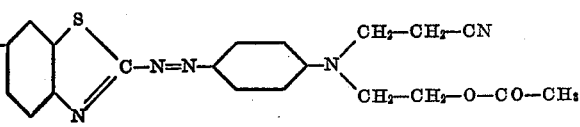

Its melting point is 149° and it has similar fastness properties to the previously described dyetuffs with a shade of more yellowish hue. Due to the introduction of the acetoxy radical the scarlet shades produced on triacetate and polyester fibers show a further improvement in light fastness.

EXAMPLE 8

When the 12.1 parts of 2-aminobenzothiazole-6-sulfonic acid-methylamide in Example 1 are replaced by 12.8 parts of 2-aminobenzothiazole-6-sulfonic acid-dimethylamide and at the same time the 10.5 parts of N-hydroxyethyl-N-cyanoethylaminobenzene are replaced by 11.5 parts of N-acetoxyethyl-N-cyanoethylaminobenzene, a dyestuff is obtained of the formula

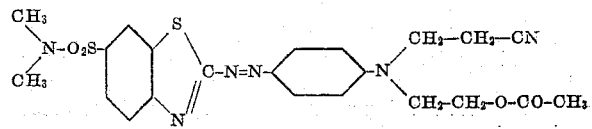

with melting point 180°. It gives on acetate, triacetate and polyester fibers scarlet shades which have similar fastness properties to those of the formerly described dyestuffs.

Polyester fibers are dyed as follows:

A dyebath is prepared with 1 part of the above described dyestuff dispersed with the aid of Turkey red oil, 6 parts of a sulfonated fatty alcohol and 3000 parts of water. 100 parts of "Dacron" polyester fiber are entered into this bath at room temperature and the temperature raised to 60° in 30 minutes. 15 parts of emulsified dichlorobenzene are added and heating continued to 100°, the bath being maintained at the boil for 1 hour. After this time the dyed material is removed, rinsed with water and dried. The scarlet shade obtained is fast to light, washing, perspiration, cross dyeing, sea water, gas fumes and heat setting.

In Table 1 below are listed further dyestuffs with similar fastness properties and in some instances better light fastness. They correspond to the formula

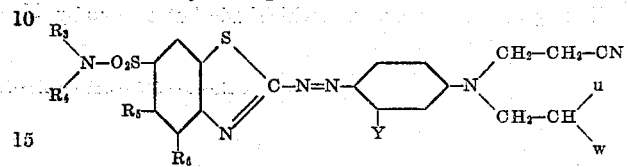

Table 1

| Example No. | $R_3$ | $R_4$ | $R_5$ | $R_6$ | Y | u | w | Shade on Secondary Acetate |
|---|---|---|---|---|---|---|---|---|
| 9 | $CH_3$ | $CH_3$ | H | H | H | H | $CH_3$ | pink. |
| 10 | $CH_3$ | $CH_3$ | H | H | H | H | $C_2H_5$ | Do. |
| 11 | $C_2H_5$ | $C_2H_5$ | H | H | H | H | H | Do. |
| 12 | $C_2H_5$ | $C_2H_5$ | H | H | H | H | $O-CO-CH_3$ | scarlet. |
| 13 | H | $C_2H_5$ | H | H | H | H | H | pink. |
| 14 | H | H | H | H | $CH_3$ | H | H | red-violet. |
| 15 | H | $CH_2-CH_2-OH$ | H | H | H | H | H | pink. |
| 16 | $CH_2-CH_2-OH$ | $CH_2-CH_2-OH$ | H | H | H | H | H | Do. |
| 17 | $CH_2-CH_2-O-H_5C_2$ | $CH_2-CH_2-O-H_5C_2$ | H | H | H | H | H | Do. |
| 18 | $CH_3$ | phenyl | H | H | H | H | $C_2H_5$ | Do. |
| 19 | $C_2H_5$ | do | H | H | H | H | $O-CO-CH_3$ | scarlet. |
| 20 | H | cyclohexyl | H | H | Cl | H | $O-CO-CH_3$ | Do. |
| 21 | $CH_3$ | $CH_3$ | $CH_3$ | H | $CH_3$ | H | $CH_3$ | red-violet. |
| 22 | $CH_3$ | $CH_3$ | $C_2H_5$ | H | Br | H | OH | yellowish pink. |
| 23 | $CH_3$ | H | H | $CH_3$ | $C_2H_5$ | H | $O-CO-CH_3$ | pink. |
| 24 | $CH_3$ | $CH_3$ | H | $C_2H_5$ | H | H | H | Do. |
| 25 | $CH_3$ | H | $CH=CH-CH=CH$ | | H | OH | $CH_2-OH$ | red-violet. |
| 26 | $C_4H_9$ | H | $CH=CH-CH=CH$ | | H | H | H | Do. |
| 27 | $CH_3$ | $CH_3$ | H | H | $OCH_3$ | H | $C_2H_5$ | pink. |
| 28 | H | $CH_3$ | H | H | $OC_2H_5$ | H | $O-CO-CH_3$ | Do. |
| 29 | $CH_3$ | $CH_3$ | H | H | $CF_3$ | H | $O-CO-C_2H_5$ | scarlet. |
| 30 | $CH_3$ | $CH_3$ | H | H | H | $CH_3$ | OH | pink. |
| 31 | $CH_3$ | $CH_3$ | H | H | H | $CH_3$ | $O-CO-CH_3$ | scarlet. |
| 32 | H | $CH_3$ | H | H | H | H | $O-CO-NH-C_2H_5$ | pink. |
| 33 | $CH_3$ | $CH_3$ | H | H | H | $CH_3$ | $CH_3$ | Do. |
| 34 | $CH_2-CH-OH$ | phenyl | H | H | H | H | H | Do. |
| 35 | $CH_2-CH_2-CN$ | H | H | H | H | H | H | Do. |
| 36 | $CH_2-CH=CH_2$ | H | H | H | H | H | H | Do. |
| 37 | $CH_3$ | $CH_3$ | H | H | H | H | H | Do. |
| 38 | $C_2H_5$ | 3-methyl-phenyl | H | H | Cl | H | $O-CO-NH-C_6H_5$ | yellowish pink. |

EXAMPLE 39

When the 10.5 parts of N-hydroxyethyl-N-cyanoethyl-aminobenzene of Example 1 are replaced by 14.5 parts of N.N-bis-(acetoxyethyl)-aminobenzene, a dyestuff is obtained which has the formula

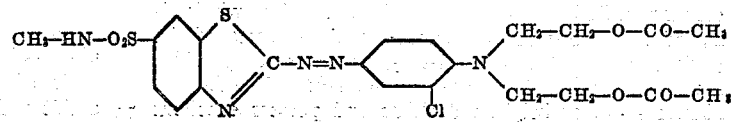

and with a melting point at 156°. Dyed at high temperatures from aqueous dispersion, preferably in presence of compounds with dispersing action, it produces on polyester, acetate and triacetate fibers brilliant pink-red shades which possess very good fastness to light, washing, perspiration, cross dyeing, sea water, gas fumes, sublimation and pleating. The dyeings are dischargeable white, and the dyestuff reserves cotton and viscose. The wool reserve is very good, especially when the blended yarn or fabric is treated after dyeing with sodium hydrosulfite. On acrylic fibers, e.g. "Orlon" (registered trade mark), only light shades can be obtained; however, they are outstandingly fast to light even in one-twenty-fifth of standard depth.

EXAMPLE 40

When the 10.5 parts of N-hydroxyethyl-N-cyanoethyl-aminobenzene of Example 1 are replaced by 15 parts and melts at 155°. It dyes cellulose acetate and triacetate fibers and polyester fibers in yellowish pink shades of good all-round fastness. Similar fastness properties are shown by the dyestuff

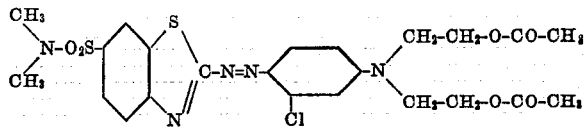

which melts at 158°.

In Table 2 further dyestuffs are listed which are suitable for dyeing polyester, acetate and triacetate fibers. They have the formula:

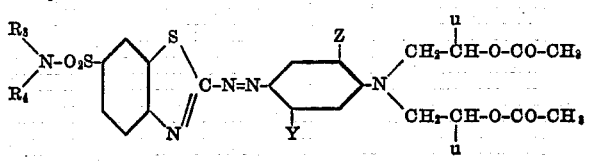

Table 2

| Example No. | $R_3$ | $R_4$ | Y | Z | u | Shade on Secondary Acetate |
|---|---|---|---|---|---|---|
| 41 | $CH_3$ | $CH_3$ | H | H | H | pink. |
| 42 | $CH_3$ | $CH_3$ | $CH_3$ | H | H | bluish pink. |
| 43 | $CH_3$ | H | $CH_3$ | H | H | Do. |
| 44 | $C_2H_5$ | H | H | H | H | pink. |
| 45 | $CH_3$ | $CH_3$ | $CH_3$ | $OCH_3$ | H | bluish pink. |
| 46 | $CH_3$ | $CH_3$ | H | H | $CH_3$ | pink. |
| 47 | $CH_3$ | $CH_3$ | $CH_3$ | $CH_3$ | H | bluish |
| 48 | $CH_3$ | H | $-NH-CO-CH_3$ | H | H | red-violet. |
| 49 | $CH_3$ | $CH_3$ | $-NH-CO-CH_3$ | H | H | Do. |
| 50 | $CH_3$ | H | $-NH-CO-C_2H_5$ | H | H | Do. |
| 51 | $CH_3$ | $CH_3$ | $-NH-CO-C_2H_5$ | H | H | Do. |
| 52 | $CH_3$ | H | $-NH-CO-CF_3$ | H | H | Do. |
| 53 | $CH_3$ | $CH_3$ | $-NH-CO-CF_3$ | H | H | Do. |
| 54 | $CH_3$ | $CH_3$ | $-NH-CO-C_9H_{19}$ | H | H | Do. |
| 55 | $CH_3$ | $CH_3$ | $-NH-CO-C_{11}H_{23}$ | H | H | Do. |
| 56 | $CH_3$ | $CH_3$ | $-NH-CO-C_{17}H_{35}$ | H | H | Do. |
| 57 | $CH_3$ | phenyl | $-NH-CO-CH_3$ | H | H | Do. |
| 58 | $C_2H_5$ | phenyl | $-NH-CO-C_2H_5$ | H | H | Do. |
| 59 | $CH_3$ | phenyl | $-NH-CO-C_9H_{19}$ | H | H | Do. |
| 60 | $C_2H_5$ | phenyl | Cl | H | H | scarlet. |
| 61 | $CH_3$ | phenyl | Cl | H | H | Do. |
| 62 | $CH_2-CH_2-OH$ | phenyl | Cl | H | H | Do. |
| 63 | H | phenyl | Cl | H | H | Do. |
| 64 | H | cyclohexyl | Cl | H | H | Do. |
| 65 | H | phenyl | Cl | H | $CH_3$ | pink. |
| 66 | H | phenyl | Cl | H | $CH_3$ | yellowish. |
| 67 | H | naphthyl | $-NH-CO-C_9H_{19}$ | H | H | red-violet. |
| 68 | $CH_3$ | $CH_3$ | $-NH-CO-CH_3$ | $O-CH_3$ | H | violet. |
| 69 | $CH_3$ | $CH_3$ | $-NH-CO-CH_3$ | $CH_3$ | H | Do. | of 1-N.N-bis-(acetoxyethyl)-amino-3-chlorobenzene, the resultant dyestuff has the formula

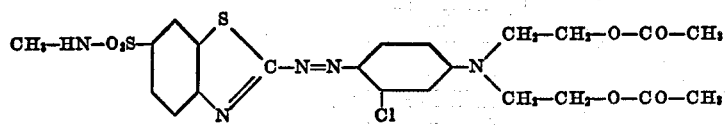

Similar properties are possessed by the dyestuffs set out in the following Table 3; they have the formula

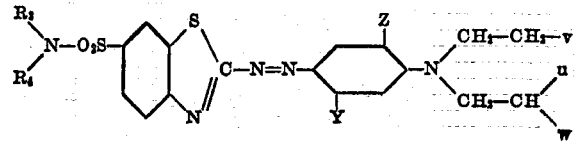

Table 3

| Example No. | $R_3$ | $R_4$ | Y | Z | u | v | w | Shade on Secondary Acetate |
|---|---|---|---|---|---|---|---|---|
| 70 | H | CH₃ | H | H | H | H | OH | red-violet. |
| 71 | H | CH₃ | H | H | H | OH | OH | Do. |
| 72 | H | CH₃ | Cl | H | H | OH | OH | pink. |
| 73 | CH₃ | CH₃ | H | H | H | OH | OH | red-violet. |
| 74 | H | CH₃ | H | H | CH₃ | H | OH | Do. |
| 75 | H | CH₃ | CF₃ | H | CH₂—OH | H | OH | pink. |
| 76 | H | CH₃ | NH—CO—CH₃ | H | H | OH | OH | violet. |
| 77 | H | CH₃ | NH—CO—CH₃ | O—CH₃ | H | OH | OH | Do. |
| 78 | H | CH₃ | NH—CO—CH₃ | H | CH₂—OH | H | OH | Do. |
| 79 | H | CH₃ | NH—CO—CH₃ | O—CH₃ | CH₂—OH | H | OH | Do. |
| 80 | H | CH₃ | NH—CO—C₂H₅ | H | H | OH | OH | Do. |
| 81 | CH₃ | CH₃ | H | H | F | H | F | pink. |
| 82 | H | C₂H₅ | F | H | F | H | F | Do. |
| 83 | C₂H₅ | C₂H₅ | H | H | F | H | F | Do. |
| 84 | H | CH₃ | CH₃ | H | H | OH | OH | red-violet. |
| 85 | CH₃ | CH₃ | CH₃ | H | CH₂—OH | H | OH | Do. |
| 86 | CH₃ | CH₃ | CH₃ | H | F | OH | F | bluish pink. |
| 87 | C₂H₅ | C₂H₅ | H | H | CN | OH | CHF₂ | pink. |
| 88 | C₂H₅ | H | H | H | CN | OH | CF₃ | Do. |
| 89 | H | H | H | H | CN | OH | CHF₂ | pink. |
| 90 | CH₃ | CH₃ | CH₃ | H | OH | OH | CF₃ | Do. |
| 91 | H | CH₃ | H | H | F | O—CO—CH₃ | F | scarlet. |
| 92 | CH₃ | CH₃ | Cl | H | F | O—CO—CH₃ | F | Do. |
| 93 | CH₃ | CH₃ | C₂H₅ | H | F | O—CO—CH₃ | F | Do. |
| 94 | H | CH₃ | CH₃ | H | F | O—CO—CH₃ | F | Do. |
| 95 | H | CH₃ | H | H | F | O—CO—CH₃ | F | Do. |
| 96 | CH₃ | CH₃ | H | H | H | H | O—CH₃ | pink. |
| 97 | H | CH₃ | H | H | H | H | O—C₂H₅ | pink. |
| 98 | CH₃ | CH₃ | CH₃ | H | H | C₂H₅ | OH | red-violet. |
| 99 | H | CH₃ | CH₃ | H | OH | CO—O—CH₃ | H | pink. |
| 100 | CH₃ | CH₃ | H | H | OH | CO—O—CH₃ | H | Do. |
| 101 | H | CH₃ | CH₃ | H | H | CO—O—CH₃ | H | Do. |
| 102 | CH₃ | CH₃ | H | H | H | CO—O—CH₃ | H | Do. |
| 103 | H | CH₃ | H | H | H | CO—O—C₂H₅ | H | Do. |
| 104 | CH₃ | CH₃ | H | H | OH | CO—O—C₂H₅ | H | Do. |
| 105 | H | CH₃ | CH₃ | H | H | CO—O—C₂H₅ | H | Do. |
| 106 | CH₃ | CH₃ | H | H | H | CO—O—C₂H₅ | H | Do. |
| 107 | H | CH₃ | H | H | H | H | O—CO—NH—C₂H₅ | red-violet. |
| 108 | CH₃ | CH₃ | Cl | H | H | H | O—CO—NH—C₂H₅ | pink. |
| 109 | H | CH₃ | CH₃ | H | H | H | O—CO—NH—C₂H₅ | red-violet. |
| 110 | CH₃ | CH₃ | H | H | H | H | O—CO—NH—C₂H₅ | Do. |
| 111 | H | CH₃ | H | H | CH₃ | H | O—CO—NH—C₂H₅ | Do. |
| 112 | CH₃ | CH₃ | H | H | CH₃ | H | O—CO—NH—C₂H₅ | Do. |
| 113 | H | CH₃ | H | H | H | O—CO—NH—C₂H₅ | O—CO—NH—C₂H₅ | Do. |
| 114 | CH₃ | CH₃ | Cl | H | H | O—CO—NH—C₂H₅ | O—CO—NH—C₂H₅ | pink. |
| 115 | H | CH₃ | CH₃ | H | H | O—CO—NH—C₂H₅ | O—CO—NH—C₂H₅ | red-violet. |
| 116 | CH₃ | CH₃ | H | H | H | O—CO—NH—C₂H₅ | O—CO—NH—C₂H₅ | Do. |
| 117 | H | CH₃ | CH₃ | OCH₃ | H | H | OH | Do. |
| 118 | CH₃ | CH₃ | CH₃ | OCH₃ | H | C₂H₅ | OH | Do. |

Equally good affinity and in some cases greater purity of shade are shown by the dyestuffs of Table 4, which are produced by the same methods as the foregoing and have the formula

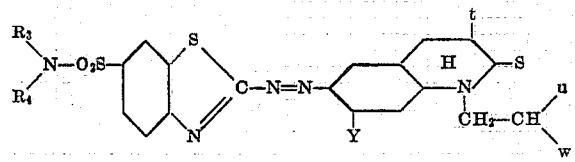

The higher molecular dyestuffs of the general formula:

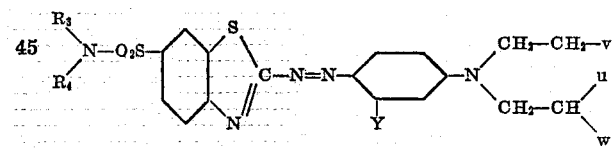

possess in general lower affinity for hydrophobic fibers. However, they are excellent for coloring lacquer media, oils, synthetic resins and manufactured fibers in the mass.

Table 4

| Example No. | $R_3$ | $R_4$ | Y | s | t | u | w | Shade on Secondary Acetate |
|---|---|---|---|---|---|---|---|---|
| 119 | H | CH₃ | Cl | H | H | H | OH | red. |
| 120 | H | CH₃ | Cl | H | H | OH | CH₂—OH | Do. |
| 121 | H | CH₃ | Cl | H | H | OH | CH₃ | Do. |
| 122 | H | CH₃ | Cl | CH₃ | H | H | OH | Do. |
| 123 | H | CH₃ | Cl | CH₃ | H | OH | CH₂—OH | Do. |
| 124 | H | CH₃ | Cl | CH₃ | H | OH | CH₃ | Do. |
| 125 | H | CH₃ | CH₃ | H | H | H | OH | red-violet. |
| 126 | H | CH₃ | CH₃ | H | H | OH | CH₂—OH | Do. |
| 127 | H | CH₃ | CH₃ | H | H | OH | CH₃ | Do. |
| 128 | H | CH₃ | CH₃ | H | OH | H | OH | Do. |
| 129 | H | CH₃ | CH₃ | H | OH | OH | CH₂—OH | Do. |
| 130 | H | CH₃ | CH₃ | H | OH | OH | CH₃ | Do. |
| 131 | C₂H₅ | C₂H₅ | Cl | H | H | H | OH | red. |
| 132 | C₂H₅ | C₂H₅ | Cl | H | H | OH | CH₂—OH | Do. |
| 133 | C₂H₅ | C₂H₅ | Cl | H | H | OH | CH₃ | Do. |
| 134 | CH₃ | CH₃ | Cl | H | H | OH | OH | Do. |
| 135 | CH₃ | CH₃ | Cl | H | H | OH | CH₂—OH | Do. |
| 136 | CH₃ | CH₃ | Cl | H | H | OH | CH₃ | Do. |
| 137 | H | CH₃ | CH₃ | CH₃ | H | H | OH | red-violet. |
| 138 | H | CH₃ | CH₃ | CH₃ | H | OH | CH₂—OH | Do. |
| 139 | H | CH₃ | CH₃ | CH₃ | H | OH | CH₃ | Do. |
| 140 | CH₃ | CH₃ | CH₃ | CH₃ | H | H | OH | Do. |
| 141 | CH₃ | CH₃ | CH₃ | CH₃ | H | OH | CH₂—OH | Do. |
| 142 | CH₃ | phenyl | CH₃ | H | H | OH | OH | Do. |

The wet fastness properties of dyestuffs of such large molecular size are naturally superior to those of the previously described dyestuffs, and with some of them the very highest fastness to boiling, cross dyeing and saponification is obtained. The dyestuffs enumerated in Table 5 are of special interest; they conform to the are suitable for coloring lacquer media, oils, synthetic resins and manufactured fibers in the mass. In the formula shown Y, w and u represent preferably hydrogen or methyl and v hydrogen, methyl, ethyl, cyano, hydroxy, acetoxy or the phenylcarbamic acid ester group. Especially worthy of note are the following dyestuffs:

EXAMPLE 170

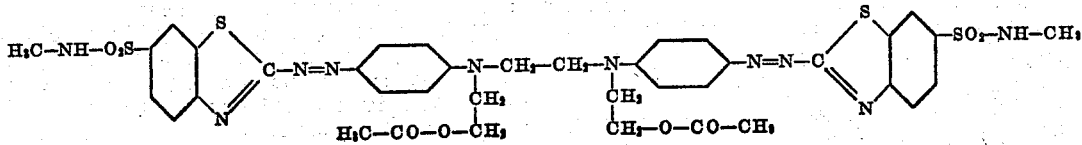

and

EXAMPLE 171

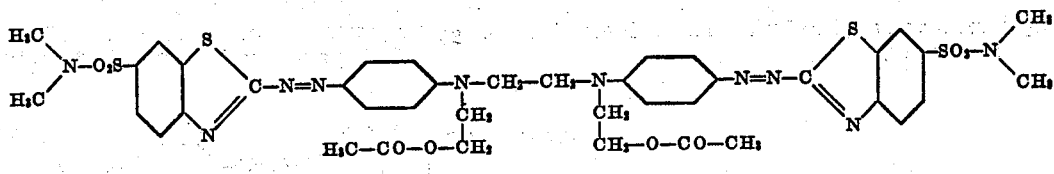

formula shown above and are characterized by the symbols $R_3$, $R_4$, Y, u, v and w.

which dye cellulose acetate in the mass in brilliant, fast-to-light red shades with very good wet fastness properties.

*Table 5*

| Example No. | $R_3$ | $R_4$ | Y | u | v | w |
|---|---|---|---|---|---|---|
| 143 | H | CH$_3$ | H | H | H | O—CO—NH—C$_6$H$_5$ |
| 144 | H | CH$_3$ | CH$_3$ | H | H | O—CO—NH—C$_6$H$_5$ |
| 145 | H | CH$_3$ | H | H | O—CO—NH—C$_6$H$_5$ | O—CO—NH—C$_6$H$_5$ |
| 146 | H | CH$_3$ | Cl | H | O—CO—NH—C$_6$H$_5$ | O—CO—NH—C$_6$H$_5$ |
| 147 | H | CH$_3$ | CH$_3$ | H | O—CO—NH—C$_6$H$_5$ | O—CO—NH—C$_6$H$_5$ |
| 148 | H | CH$_3$ | H | CH$_3$ | H | O—CO—NH—C$_6$H$_5$ |
| 149 | CH$_3$ | CH$_3$ | Cl | H | O—CO—NH—C$_6$H$_5$ | O—CO—NH—C$_6$H$_5$ |
| 150 | H | C$_2$H$_5$ | Cl | H | O—CO—NH—C$_6$H$_5$ | O—CO—NH—C$_6$H$_5$ |
| 151 | C$_2$H$_5$ | C$_2$H$_5$ | Cl | H | O—CO—CH$_3$ | O—CO—CH$_3$ |
| 152 | CH$_3$ | phenyl | Cl | H | O—CO—CH$_3$ | O—CO—NH—C$_6$H$_5$ |
| 153 | CH$_3$ | phenyl | Cl | H | O—CO—CH$_3$ | O—CO—CH$_3$ |
| 154 | C$_2$H$_5$ | phenyl | Cl | H | O—CO—NH—C$_6$H$_5$ | O—CO—NH—C$_6$H$_5$ |
| 155 | C$_2$H$_5$ | phenyl | Cl | H | O—CO—CH$_3$ | O—CO—CH$_3$ |
| 156 | CH$_2$—CH$_2$—OH | phenyl | Cl | H | O—CO—NH—C$_6$H$_5$ | O—CO—NH—C$_6$H$_5$ |
| 157 | CH$_2$—CH$_2$—OH | phenyl | Cl | H | O—CO—CH$_3$ | O—CO—CH$_3$ |
| 158 | H | phenyl | Cl | H | O—CO—NH—C$_6$H$_5$ | O—CO—NH—C$_6$H$_5$ |
| 159 | H | phenyl | Cl | H | O—CO—CH$_3$ | O—CO—CH$_3$ |
| 160 | H | 4'-methylphenyl | Cl | H | O—CO—CH$_3$ | O—CO—CH$_3$ |
| 161 | H | cyclohexyl | Cl | H | O—CO—NH—C$_6$H$_5$ | O—CO—NH—C$_6$H$_5$ |
| 162 | H | cyclohexyl | Cl | H | O—CO—CH$_3$ | O—CO—CH$_3$ |
| 163 | H | benzyl | Cl | H | O—CO—CH$_3$ | O—CO—CH$_3$ |
| 164 | H | phenylethyl | Cl | H | O—CO—CH$_3$ | O—CO—CH$_3$ |
| 165 | H | 3'-hydroxymethylphenyl | Cl | H | O—CO—CH$_3$ | O—CO—CH$_3$ |
| 166 | H | benzyl | Cl | H | O—CO—NH—C$_6$H$_5$ | O—CO—NH—C$_6$H$_5$ |
| 167 | H | phenylethyl | Cl | H | O—CO—NH—C$_6$H$_5$ | O—CO—NH—C$_6$H$_5$ |
| 168 | H | 3'-hydroxymethylphenyl | Cl | H | O—CO—NH—C$_6$H$_5$ | O—CO—NH—C$_6$H$_5$ |
| 169 | C$_2$H$_5$ | 3'-methylphenyl | Cl | H | O—CO—NH—C$_6$H$_5$ | O—CO—NH—C$_6$H$_5$ |

A number of the dyestuffs of Examples 143 to 169 are readily soluble in acetone and dye fibers—notably cellulose acetate—in the mass in brilliant, fast-to-light red shades. Those dyestuffs in which Y represents chlorine yield the most yellowish reds and are the fastest to gas fumes.

Besides the dyestuffs already named, the disazo dyestuffs produced by coupling 2 moles of a 2-diazobenzothiazole-6-sulfonic acid amide with 1 mol of an amine of the formula

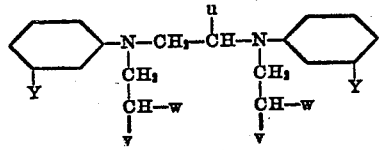

Formulae of representative dyestuffs of the foregoing examples are as follows:

EXAMPLE 41

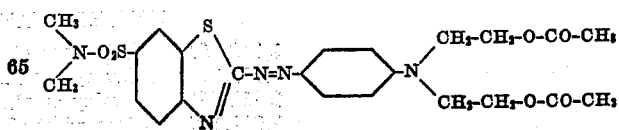

EXAMPLE 51

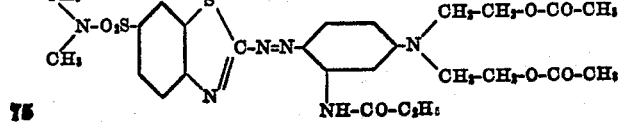

EXAMPLE 149

Having thus disclosed the invention, what we claim is:
1. A azo dyestuff which corresponds to the formula wherein $R_1$ represents an alkylene hydrocarbon radical with 1 to 4 carbon atoms, $R_2$ represents a member selected from the group consisting of lower hydroxyalkyl, lower dihydroxyalkyl, lower alkoxyalkyl, lower cyanoalkyl, lower acetoxyalkyl, lower propionyloxyalkyl, polyfluoromethyl, fluorinated lower cyanoalkyl, lower carbalkoxyalkyl and lower carbamic acid alkyl ester, $R_3$ represents a member selected from the group consisting of hydrogen, lower alkyl, lower hydroxyalkyl and lower alkoxyalkyl, $R_4$ represents a member selected from the group consisting of hydrogen, lower alkyl, lower hydroxyalkyl, lower alkoxyalkyl, phenyl, methylphenyl, naphthyl, hydroxymethylphenyl, cyclohexyl, benzyl and phenylethyl, $R_5$ represents a member selected from the group consisting of hydrogen, lower alkyl and, together with $R_6$, —CH=CH—CH=CH—, $R_6$ represents a member selected from the group consisting of hydrogen, lower alkyl and, together with $R_5$, —CH=CH—CH=CH—, Y represents a member selected from the group consisting of hydrogen, chlorine, bromine, lower alkyl, lower alkoxy, trifluoromethyl, trifluoroacetyl, alkanoylamino with at most 18 carbon atoms, M represents a member selected from the group consisting of hydrogen, hydroxyl, lower alkoxy, acetoxy and lower carbamic acid alkyl ester, when $n$ stands for the figure 1, and a simple C-N linkage when $n$ stands for the figure 2, Z represents a member selected from the group consisting of hydrogen, methyl, methoxy and, together with —N—CH$_2$—R$_2$ and the adjacent benzene nucleus, a tetrahydroquinoline ring, and $n$ represents one of the integers 1 and 2.

2. The monoazo dyestuff of the formula

3. The monoazo dyestuff of the formula

4. The monoazo dyestuff of the formula

5. The monoazo dyestuff of the formula

6. The monoazo dyestuff of the formula

References Cited in the file of this patent
UNITED STATES PATENTS

| | | |
|---|---|---|
| 2,149,051 | Helberger et al. | Feb. 28, 1939 |
| 2,785,157 | Straley et al. | Mar. 12, 1957 |
| 2,832,761 | Straley et al. | Apr. 29, 1958 |
| 2,889,315 | Bossard et al. | June 2, 1959 |

UNITED STATES PATENT OFFICE
CERTIFICATION OF CORRECTION

Patent No. 2,980,666                        April 18, 1961

Ernest Merian et al.

It is hereby certified that error appears in the above numbered patent requiring correction and that the said Letters Patent should read as corrected below.

Column 2, line 45, for "X" read -- Z --; column 5, line 10, for "Dyeing" read -- Dyeings --; line 71, for "soluiton" read -- solution --; column 6, EXAMPLE 5, the left-hand portion of the formula should appear as shown below instead of as in the patent:

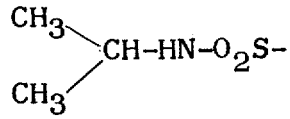

column 16, claim 3, the lower right-hand portion of the formula should appear as shown below instead of as in the patent:

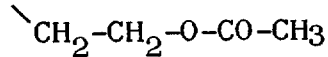

Signed and sealed this 28th day of November 1961.

(SEAL)
Attest:

ERNEST W. SWIDER                        DAVID L. LADD

Attesting Officer                        Commissioner of Patents